C. BYERLEY.
SUGAR BOWL.
APPLICATION FILED NOV. 21, 1914.

1,173,768.

Patented Feb. 29, 1916.
2 SHEETS—SHEET 1.

WITNESSES

INVENTOR
Cecil Byerley
BY
ATTORNEYS

C. BYERLEY.
SUGAR BOWL.
APPLICATION FILED NOV. 21, 1914.

1,173,768.

Patented Feb. 29, 1916.
2 SHEETS—SHEET 2.

WITNESSES

INVENTOR
Cecil Byerley
BY
ATTORNEYS

UNITED STATES PATENT OFFICE.

CECIL BYERLEY, OF RIDGEWOOD, NEW JERSEY.

SUGAR-BOWL.

1,173,768.  Specification of Letters Patent.  Patented Feb. 29, 1916.

Application filed November 21, 1914.   Serial No. 873,345.

*To all whom it may concern:*

Be it known that I, CECIL BYERLEY, a citizen of the United States, and a resident of Ridgewood, in the county of Bergen and State of New Jersey, have invented a new and Improved Sugar-Bowl, of which the following is a full, clear, and exact description.

This invention relates to improvements in sugar bowls and the like and has more particular reference to means for discharging a measured quantity of granulated sugar or like material so as to obviate unsanitary conditions due to the use of spoons by various persons for obtaining sugar from a bowl.

A further object of the invention is to provide an improved sanitary sugar bowl provided with a hopper bottom and improved means for receiving and discharging sugar through an outlet spout in the bottom of the bowl and leading therefrom, so as to discharge the sugar into a cup without the necessity of handling the same with a spoon, while the bowl is provided with a removable bottom whereby the interior parts can be readily cleansed.

With the above and other objects in view, the invention resides in the peculiar combination and arrangement of parts to be hereinafter more fully described, illustrated and claimed, it being also an object to provide a device which is simple in construction, durable and efficient.

Reference is to be had to the accompanying drawings forming a part of this specification, in which similar characters of reference indicate corresponding parts in all the views, and in which—

Figure 1:
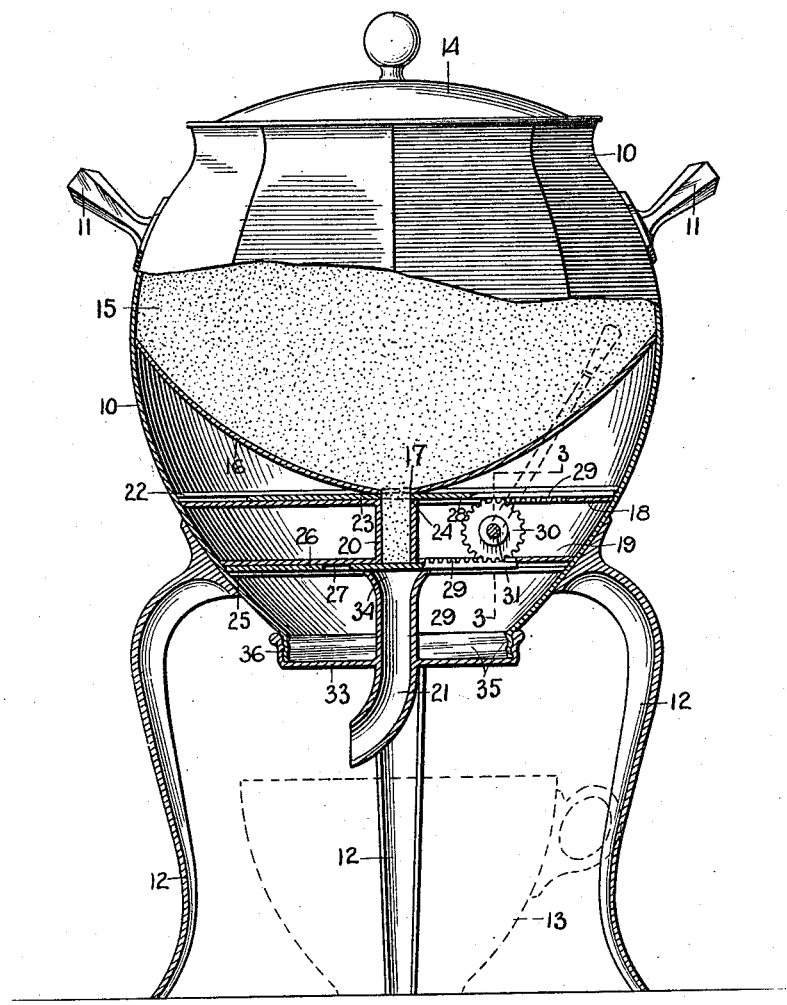
Figure 2:
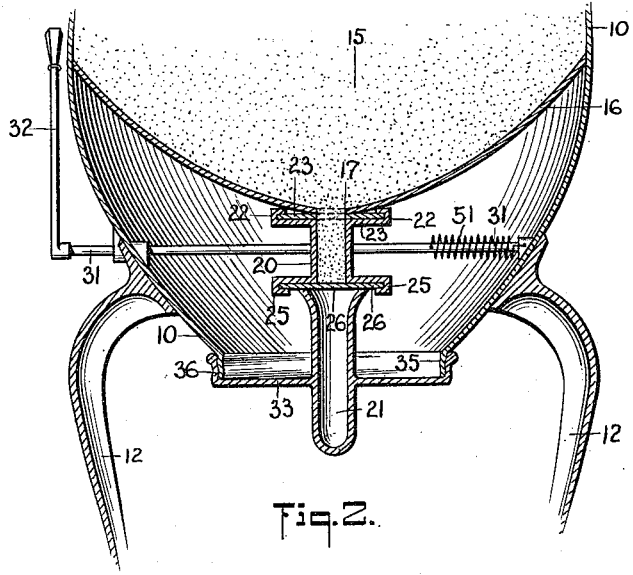
Figure 5:
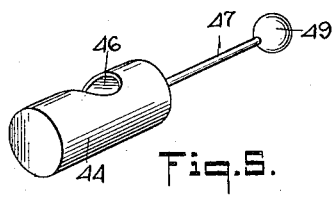
Figure 3:
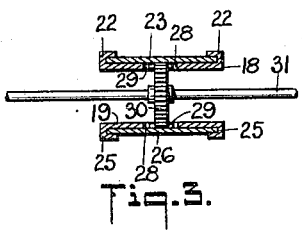
Figure 4:
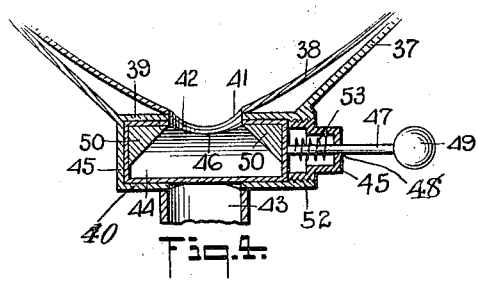

Figure 1 is a side elevation partly in vertical section of one form of the improved sugar bowl; Fig. 2 is a cross sectional view thereof at right angles to Fig. 1 and with the upper and lower parts of the bowl omitted; Fig. 3 is a cross sectional view taken on the line 3—3 of Fig. 1; Fig. 4 is a cross sectional view of a modified form of bowl or discharge means therefor; Fig. 5 is a perspective view of the discharge member employed in the form of the invention illustrated in Fig. 4.

As illustrated, the numeral 10 designates a bowl of any preferred contour but preferably tapered toward its bottom and provided with one or more handles 11 for carrying the same and having legs 12 designed to support the bowl at a spaced distance from the table surface so that it will accommodate a cup 13 therebeneath. The top of the bowl is closed by a cover or lid 14 so that the sugar 15 therein will be maintained in a sanitary condition. This sugar is supported upon a false bottom 16 constituting a hopper having a discharge opening 17 centrally of the lower portion thereof. The contour of this opening is preferably square but may be any other shape desired.

In the form of the invention illustrated in Figs. 1 to 3, inclusive, a pair of horizontal partitions 18 and 19 are secured transversely of the bowl beneath the false bottom 16, their ends being attached to the inner wall of the bowl so as to dispose them in spaced relation vertically and parallel throughout their extent. These partitions are connected by a sleeve 20 providing a discharge passage communicating with the storage space of the bowl through the opening 17 and with a discharge spout 21 leading from the bottom of the bowl. The partition 18 has its longitudinal edges bent upwardly and inwardly to provide guideways 22 which slidably receive a valve plate 23 in such a manner that the latter is supported upon the partition and designed to be reciprocated in order to move an opening 24 therethrough into and out of alinement with the opening 17 and passage through the sleeve 20.

The lower partition 19 has its longitudinal edges bent downwardly and inwardly to provide guideways 25 which slidably receive a valve plate 26 having an opening 27 disposed in opposite position relative to the opening and passage, in relation to the relative position of the opening 24 thereto. In other words, when the plate 23 has its opening 24 in alinement with the opening 17 and passage 20 to open the upper end of the sleeve and allow the discharge of sugar therein, the lower plate will be in a position to close the lower end of the sleeve, which is made of such a size as to constitute a receptacle for holding a measured quantity of sugar, such as a teaspoonful. In this last position the opening 27 will be out of alinement with the passage of the sleeve but upon opposite reciprocation of the slide plates or valves the upper end of the sleeve will be closed between the false bottom 16 and the partition 18 where the slide plate 23 operates and in such a manner as to prevent the escape of sugar between the parts while the opening 27 will be brought into alinement with the passage vertically and the sugar will be discharged therefrom through the spout 21 and into the cup. To accomplish this each partition is provided with a longitudinal slot 28 and projecting in an opposed relation from the slide plates 23 and 26 are rack bars or teeth 29 which are engaged by a pinion 30, the teeth of which are normally disposed in mesh therewith. This pinion is fixed to a shaft 31 journaled transversely to the bowl and capable of being turned by an operating member which may be in the form of a lever 32 located at one side of the bowl so that by swinging the lever or rotating the shaft a slight degree opposite sliding movement or reciprocation will be imparted to the slide plates or valves due to the location thereof on opposite sides of the pinion.

The spout 21 which is preferably carried by or formed integral with a removable bottom portion 33 provided for the bowl, has a flared or enlarged upper end 34, between which and the partition 19 the plate 26 operates, and the purpose of this flared portion is to cause the entire discharge of the sugar into the spout without escaping between these parts. The purpose of removably attaching the bottom portion 33 to the bowl is to permit the same to be removed whereby the interior working parts can be cleaned and thereby permit the bowl to be retained in a sanitary condition. In order to effect this removable attachment the bowl is preferably provided with a threaded depending flange 35 engaged by a threaded flange 36 of the removable bottom 33, although any other form of attachment to removably secure the bottom in position may be employed.

In the form of the invention illustrated in Figs. 4 and 5 of the drawings, in lieu of the hopper bottom 16 located at a considerably spaced distance from the bottom of the bowl proper, the bowl is indicated by the numeral 37 and is provided with a false or hopper bottom 38 located in juxtaposition to the bottom thereof which is indicated by the numeral 39. The bowl is further provided with a depending portion or receptacle extension 40 preferably of cylindrical form which communicates with the interior of the bowl through openings 41 and 42 in the false bottom 38 and the bottom portion 39 respectively, while the lower portion of the receptacle extension or sleeve 40 is provided with an opening having a discharge spout 43 leading therefrom.

A cylindrical shell or discharge member 44 is turnably mounted in the extension or sleeve 40 and is provided with closed end walls 45 and an opening 46 in its lateral wall adapted to be brought in alinement with the openings 41 and 42 to permit the discharge of sugar thereinto. It is then turned by means of a shaft or stem 47 projecting from one end 45 through an opening 48 in one end of the receptacle extension or sleeve 40, the shaft being provided with a grasping member 49 by which it may be operated to rotate the discharge member or cylinder 44 a half turn in order to bring the opening 46 above the opening of the discharge spout 43, whereby the contents thereof will be emptied. In order to insure the full discharge of the contents of the discharge member or cylinder 44, the corner portions thereof at opposite sides of the opening 46 are filled in as shown at 50, or otherwise constructed to provide inclined side portions constituting a hopper-like receptacle.

The plates 23 and 26 are of such lengths as to abut the wall of the bowl at their ends and in this manner limit the movements of the plates when the openings 24 and 27 are moved into and out of alinement with the opening 17 and passage 20. In this manner a limit is placed upon the movement of the operating member or lever 32 and a spring 51 connected to the shaft 31 and to the bearing of the shaft at one end, normally acts to hold the plates and lever in the position shown in Fig. 1 so that the passage will be closed at its lower end and open at its upper end to admit sugar thereto after a discharge has been effected. A similar structure is employed in connection with the other form of the device in which one end wall 45 is removably secured in position as by threading the same, as shown at 52, which also permits the removal of the discharge member 44. A spring 53 is secured to the shaft 47 and a stationary part so as to normally hold said discharge member with its opening 46 in alinement with the openings 41 and 42, said spring also serving the function of limiting the turning movement of the discharge member to a position in which the contents thereof will be emptied.

Having thus described my invention, what I claim as new and desire to secure by Letters Patent is:—

In a device of the character set forth, the combination of a receptacle having a hopper bottom with a discharge opening therein, a cylindrical receptacle having a filling opening and a discharge opening secured to the receptacle below said bottom discharge opening, one end of the cylindrical receptacle being permanently closed, a removable closure for the other end of the cylindrical receptacle, a rotary cylindrical measuring device mounted in the cylindrical receptacle substantially filling the same, said measuring device having an opening in one side adapted to register with the receptacle openings, a discharge spout leading downwardly from the cylindrical receptacle, inclined filler members secured in the ends of the measuring device adjacent the side opening thereof, a spring secured in the removable end of the receptacle, a stem secured to the end of the measuring device and extending thence through the removable end closure in axial alinement with the measuring device, said spring being connected to said stem and serving to normally hold the side opening of the measuring device in registry with the filling opening of the receptacle, and means connected to the stem to rotate the receptacle against the force of said spring to bring the measuring device opening into registry with the discharge spout.

In testimony whereof I have signed my name to this specification in the presence of two subscribing witnesses.

CECIL BYERLEY.

Witnesses:
JOHN E. BURCH,
PHILIP D. ROLLHAUS.

Copies of this patent may be obtained for five cents each, by addressing the "Commissioner of Patents, Washington, D. C."